United States Patent
Weiss

(10) Patent No.: US 12,050,461 B2
(45) Date of Patent: Jul. 30, 2024

(54) VIDEO SYSTEM WITH FRAME SYNTHESIS

(71) Applicant: DoorDash, Inc., San Francisco, CA (US)

(72) Inventor: Alexander Beer Weiss, San Francisco, CA (US)

(73) Assignee: DOORDASH, INC., San Francisco, CA (US)

( * ) Notice: Subject to any disclaimer, the term of this patent is extended or adjusted under 35 U.S.C. 154(b) by 773 days.

(21) Appl. No.: 16/563,314

(22) Filed: Sep. 6, 2019

(65) Prior Publication Data

US 2020/0081431 A1    Mar. 12, 2020

Related U.S. Application Data

(60) Provisional application No. 62/728,321, filed on Sep. 7, 2018.

(51) Int. Cl.
| | |
|---|---|
| G05D 1/00 | (2024.01) |
| G06F 16/71 | (2019.01) |
| G06N 3/02 | (2006.01) |
| H04N 5/265 | (2006.01) |
| H04N 7/01 | (2006.01) |
| H04N 23/54 | (2023.01) |

(Continued)

(52) U.S. Cl.
CPC ......... *G05D 1/0038* (2013.01); *G05D 1/0022* (2013.01); *G06F 16/71* (2019.01); *G06N 3/02* (2013.01); *H04N 5/265* (2013.01); *H04N 7/0127* (2013.01); *H04N 7/0135* (2013.01); *H04N 23/54* (2023.01); *H04L 67/12* (2013.01); *H04L 69/16* (2013.01)

(58) Field of Classification Search
CPC .... G05D 1/0038; G05D 1/0022; G06F 16/71; G06N 3/02; H04N 5/2253; H04N 5/265; H04N 7/0127; H04N 7/0135; H04L 67/12; H04L 69/16
USPC .......................................................... 701/2
See application file for complete search history.

(56) References Cited

U.S. PATENT DOCUMENTS

2003/0161354 A1 *  8/2003  Bader ................... H04L 1/0041
                                                                370/537
2006/0251330 A1 * 11/2006  Toth ........................ H04N 19/52
                                                                375/E7.113

(Continued)

OTHER PUBLICATIONS

Szegedy (Inception-v3: Rethinking the Inception Architecture for Computer Vision), Vita Lab, May 17, 2017.*

(Continued)

*Primary Examiner* — James T Boylan
(74) *Attorney, Agent, or Firm* — Kwan & Olynick LLP

(57) ABSTRACT

A remote vehicle control system includes a vehicle mounted sensor system including a video camera system for producing video data. A data handling system is connected to a network to transmit data to and receive data from a remote teleoperation site. A virtual control system is configured to receive the video, provide a user with a live video stream supported by machine intelligence directed frame synthesis, and transmit control instructions to the remote vehicle over the network. The frame synthesis is supported by a convolutional neural network. The frame synthesis may be used to interpolate frames to increase effective frames per second. The frame synthesis may be used to extrapolate frames to replace missing or damaged video frames.

23 Claims, 6 Drawing Sheets

(51) Int. Cl.
*H04L 67/12* (2022.01)
*H04L 69/16* (2022.01)

(56) References Cited

U.S. PATENT DOCUMENTS

| | | | | |
|---|---|---|---|---|
| 2009/0148058 A1* | 6/2009 | Dane | ............... | H04N 19/61 |
| | | | | 382/251 |
| 2009/0222709 A1* | 9/2009 | Lin | ............... | H04L 1/0057 |
| | | | | 714/776 |
| 2016/0112216 A1* | 4/2016 | Sargent | ............... | G07C 5/0808 |
| | | | | 370/328 |
| 2016/0212496 A1* | 7/2016 | Lau | ............... | H04N 21/631 |
| 2017/0032244 A1* | 2/2017 | Kurata | ............... | G06N 3/084 |
| 2018/0336424 A1* | 11/2018 | Jang | ............... | G06V 10/454 |
| 2019/0220746 A1* | 7/2019 | Liu | ............... | G06N 3/08 |
| 2019/0270408 A1* | 9/2019 | Castro | ............... | B60Q 9/00 |
| 2019/0289321 A1* | 9/2019 | Liu | ............... | H04N 19/587 |
| 2019/0302761 A1* | 10/2019 | Huang | ............... | G05D 1/0221 |
| 2019/0384286 A1* | 12/2019 | Muenster | ............... | B60W 50/14 |
| 2020/0074642 A1* | 3/2020 | Wilson | ............... | G06T 7/174 |
| 2020/0175401 A1* | 6/2020 | Shen | ............... | G06N 3/045 |
| 2020/0348665 A1* | 11/2020 | Bhanushali | ............... | H04N 19/167 |
| 2021/0116907 A1* | 4/2021 | Altman | ............... | G05D 1/0038 |

OTHER PUBLICATIONS

Park (BAM: Bottleneck Attention Module), KIAST & Adobe Research, Jul. 18, 2018.*

Zhe Hu, et al., "Multi-Scale Video Frame-Synthesis Network with Transitive Consistency Loss," arXiv: 1712.02874v2 [cs.CV] Mar. 19, 2018, 12 pages.

Liu, Z., Yeh, R., Tang, X., Liu, Y. and Agarwala, A. (n.d.). Video Frame Synthesis using Deep Voxel Flow. [online] Available at: https://arxiv.org/pdf/1702.02463 Aug. 5, 2017, 9 pages.

\* cited by examiner

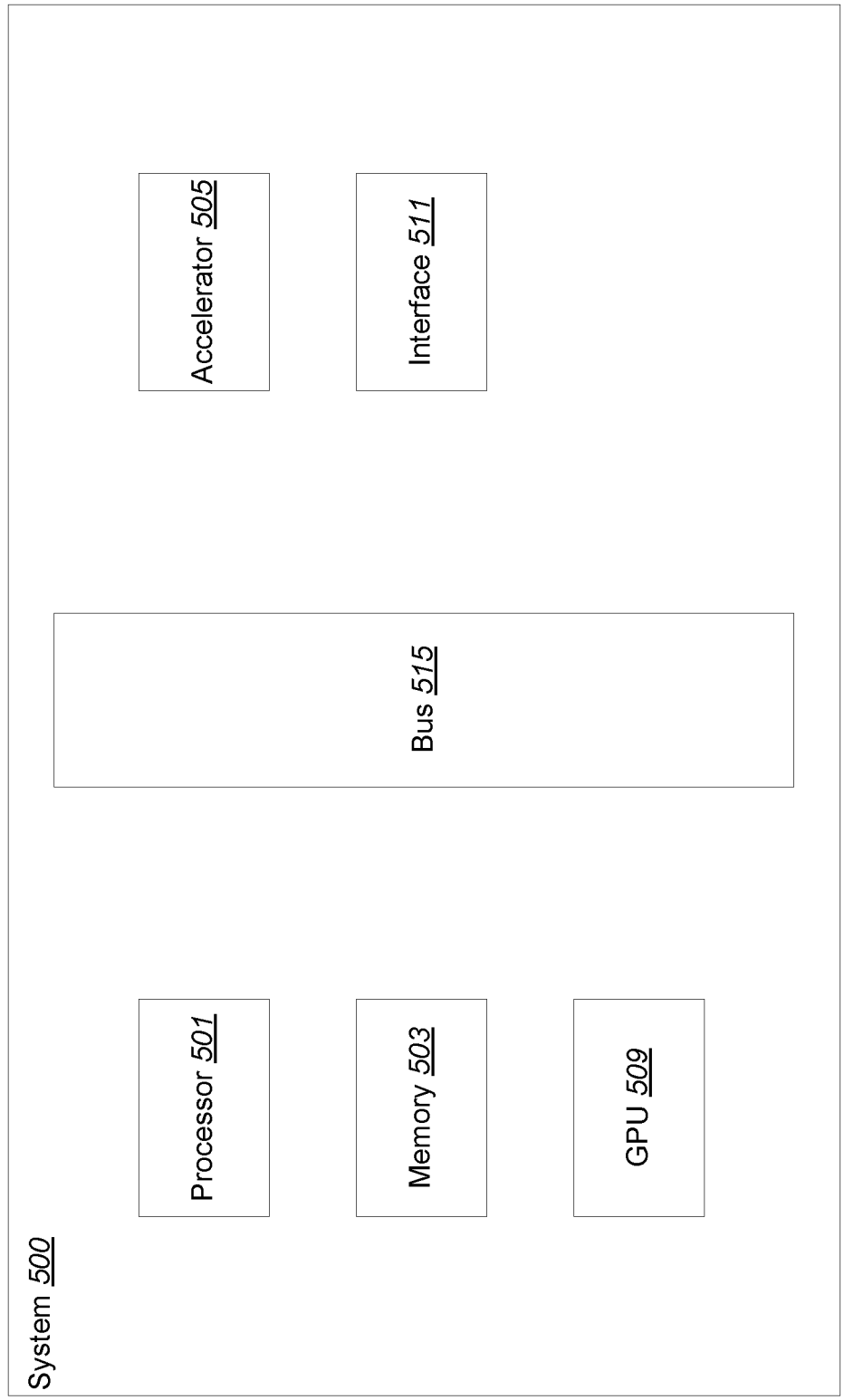

VIDEO SYSTEM WITH FRAME SYNTHESIS

CROSS-REFERENCE TO RELATED APPLICATIONS

This application claims the benefit of U.S. Provisional Application No. 62/728,321, entitled "VIDEO SYSTEM WITH FRAME SYNTHESIS," filed on Sep. 7, 2018, which is incorporated by reference herein in its entirety for all purposes.

TECHNICAL FIELD

The present disclosure relates to remote control of a vehicle. In one embodiment using video based control data, video frame synthesis is used to improve tele-operational control of the vehicle.

BACKGROUND

Remote control of autonomous or semi-autonomous vehicles using a wireless network or communication system would be useful in many situations. For example, a remote driver could maneuver a vehicle to and from a destination while being located at a convenient location and viewing the vehicle environment through multiple displays or a virtual interface. In another application, a remote operator can oversee one or more vehicles and take direct control of the vehicle in unanticipated or dangerous situations.

Remote control performance can be limited in certain situations. For example, a teleoperator user may not be able to gauge the distance to surrounding objects, vehicles, or pedestrians due to poor adaptation to a perspective shown in the video feed. Latency or other factors such as interrupted or dropped video frames can also adversely affect teleoperator perception of vehicle placement relative to its surrounding, allowing the teleoperator user to unintentionally collide or drive too close to surrounding objects, vehicles, or pedestrians. Systems that decrease or minimize this risk are needed.

SUMMARY

Problems associated with dropped video frames can be reduced or minimized by use of a remote vehicle control system such as described in the following. The remote vehicle control system can include a vehicle mounted sensor system including a video camera system for producing video data and a data handling system connected to a network to transmit data to and receive data from a remote teleoperation site such as a vehicle. A virtual control system is configured to receive the video, provide a user with a live video stream supported by frame synthesis, and transmit control instructions to the remote vehicle over the network. Frame synthesis can include frame interpolation and frame extrapolation.

The network may be a cell phone network. The virtual control system may further comprise a virtual reality headset. The frame synthesis may be supported by a convolutional neural network. The frame synthesis may be used to interpolate frames to increase effective frames per second. The frame synthesis may be used to extrapolate frames to replace missing or damaged video frames.

The data handling system may compress and/or transmit the video using feed a forward error correction module. Forward error correction can include use of maximum separable distance erasure codes such as a Cauchy Reed-Solomon code. The data handling system may transmit packets by a User Datagram Protocol (UDP).

To improve reliability, the remote vehicle control system may further comprise a video prioritization module to order video data at least in part by priority. For example, the video prioritization module can interleave video frames prior to transmission, send video streams covering forward vehicle view first in priority, or send key frames with higher priority.

Also provided is a method comprising receiving video data from a vehicle mounted sensor system including a video camera system. The video data includes a plurality of sequential image frames of a video stream, each image frame corresponding to a time position of the video stream. The method further comprises storing the plurality of image frames within a circular buffer, and generating an optical flow map based on at least two consecutive image frames, the optical flow predicting pixel positions of a virtual image frame corresponding to a desired time position of the video data. The method further comprises synthesizing the virtual image frame for insertion into the desired time position of the video stream. The optical flow map may be generated by a convolutional neural network.

The image frame may be an extrapolated image frame and the desired time position is subsequent to the time positions corresponding to the at least two consecutive image frames. The method may further comprise determining that an expected image frame corresponding to the desired time position is unavailable, and inserting the extrapolated image into the video stream subsequent to the at least two consecutive image frames.

The virtual image frame may be an interpolated image frame and the desired time position is between the time positions corresponding to the at least two consecutive image frames. The method may further comprise inserting the interpolated image into the video stream in chronological order with respect to the at least two consecutive image frames, wherein insertion of the interpolated image increases the frame rate of the video stream.

Other implementations of this disclosure include corresponding devices, systems, and computer programs configured to perform the described methods. These other implementations may each optionally include one or more of the following features. For instance, provided are one or more non-transitory computer readable media having instructions stored thereon for performing the described methods.

These and other embodiments are described further below with reference to the figures.

BRIEF DESCRIPTION OF THE DRAWINGS

The disclosure may best be understood by reference to the following description taken in conjunction with the accompanying drawings, which illustrate particular embodiments of the present disclosure. Non-limiting and non-exhaustive embodiments of the present disclosure are described with reference to the following figures, wherein like reference numerals refer to like parts throughout the various figures unless otherwise specified.

FIG. 5 illustrates a particular example of a computer system that can be used with various embodiments of the present disclosure.

DETAILED DESCRIPTION

Figure 1A:
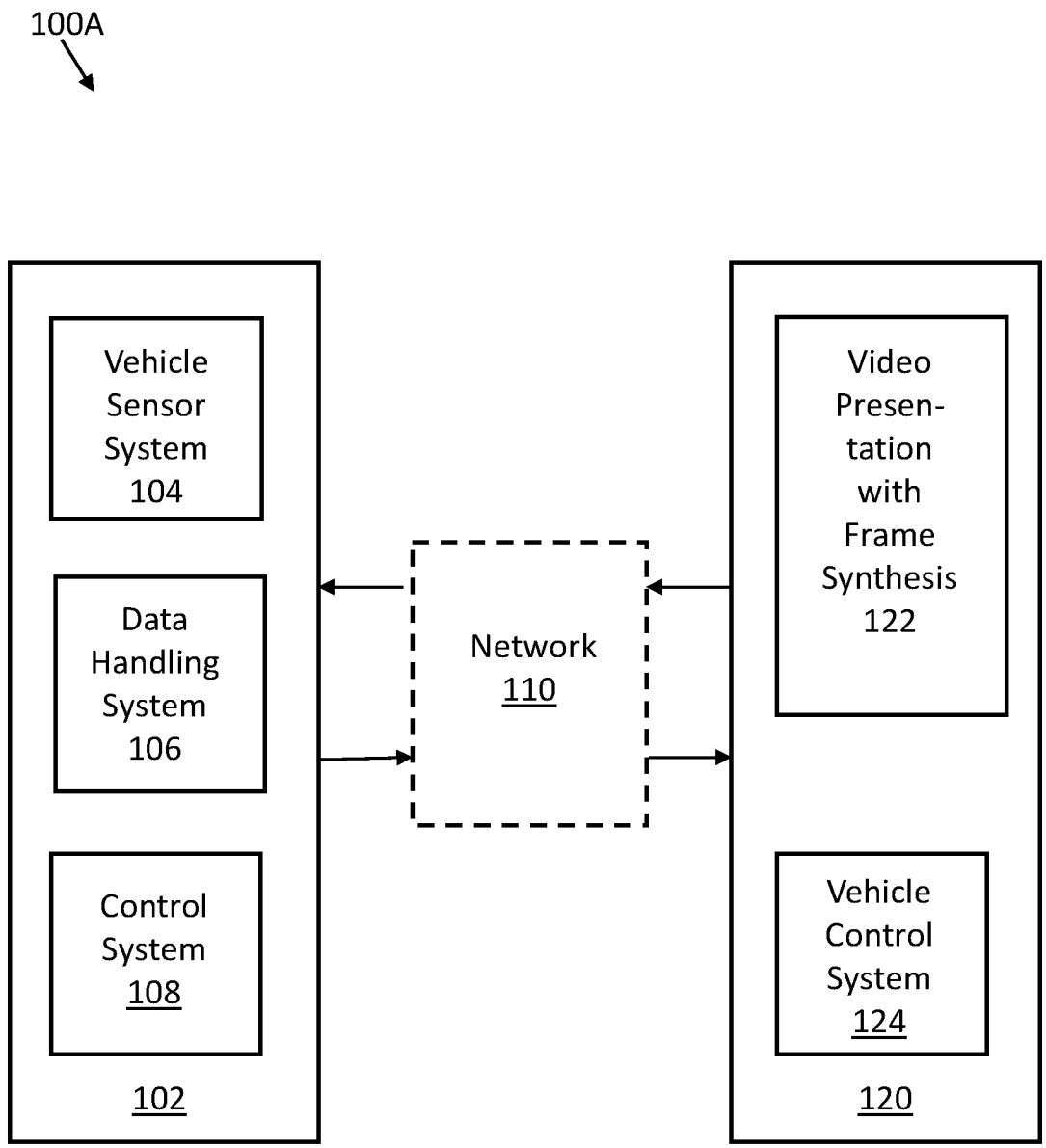
FIGS. 1A and 1B illustrate example vehicle tele-operation systems and associated modules, in accordance with one or more embodiments.

Reference will now be made in detail to some specific examples of the disclosure including the best modes contemplated by the inventors for carrying out the disclosure. Examples of these specific embodiments are illustrated in the accompanying drawings. While the present disclosure is described in conjunction with these specific embodiments, it will be understood that it is not intended to limit the disclosure to the described embodiments. On the contrary, it is intended to cover alternatives, modifications, and equivalents as may be included within the spirit and scope of the disclosure as defined by the appended claims.

In the following description, numerous specific details are set forth in order to provide a thorough understanding of the present disclosure. Particular embodiments of the present disclosure may be implemented without some or all of these specific details. In other instances, well known process operations have not been described in detail in order not to unnecessarily obscure the present disclosure.

For example, the techniques of the present invention will be described in the context of particular protocols, such as Wi-Fi or Bluetooth. However, it should be noted that the techniques of the present invention may also be applied to variations of protocols. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

The systems and methods described herein improve remote control of autonomous or semi-autonomous vehicles using a wireless network or communication system by improving live or real-time video feeds to remote teleoperators of such vehicles. Such teleoperators may be referred to herein as operators or users. Remote control performance can be limited due to interruptions in video feeds used by operators. For example, a user may not be able to gauge the distance to surrounding objects, vehicles, or pedestrians due to poor adaptation to a perspective shown in the video feed. Latency or other factors such as interrupted or dropped video frames can also adversely affect teleoperator perception of vehicle placement relative to its surrounding, allowing the teleoperator user to unintentionally collide or drive too close to surrounding objects, vehicles, or pedestrians.

The described systems and methods receive real-time or near real-time video stream from a mounted camera or other video capture system mounted on a vehicle. The video data may include a plurality of image frames corresponding to respective time positions of the video stream. The image frames are stored within a circular buffer and input into a convolutional neural network (CNN) or other machine intelligence techniques and models to generate optical flow maps of the pixels in each image frame.

An optical flow map may be used to predict the position of pixels at various other time positions. For example, a virtual image frame corresponding to a subsequent time position after the received image frames may be extrapolated and inserted into the video stream if an actual image frame corresponding to that subsequent time position is not timely received, damaged, or otherwise unavailable. This may reduce lag or interruptions in the video stream to allow for improved control and/or monitoring of the autonomous or semi-autonomous vehicle.

As another example, a virtual image frame corresponding to a time position between the received image frames may be interpolated with an optical flow map. This may improve viewing and operation of the vehicle by increasing the effective frame rate. Such frame interpolation may be used to increase frame rate from 30 frames per second (fps) to 90 fps by predicting two additional virtual image frames between each received image frame. This may allow higher video quality while reducing the amount of data transmitted over a network.

Example Embodiments

FIG. 1A illustrates a vehicle tele-operation system 100A, in accordance with one or more embodiments. As shown, a remote vehicle control system 100A includes a vehicle mounted sensor and communication system 102. The system 102 includes a vehicle sensor system 104 that can support a video camera system for producing video data and an optional distance mapping sensor system for producing distance map data. The system 102 may further include a data handling system 106 that provides data handling and transmission/reception by a network 110. In various embodiments, data handling system 106 may implement feed forward or other suitable correction techniques. Finally, the system 102 includes an autonomous or semi-autonomous control system 108 for receiving remote vehicle control data.

Video and other data sent via the network 110 is received by a virtual control system 120. Any missing frames needed for a video presentation to a human tele-operator can be predicted and inserted into a video stream with a video presentation and frame synthesis module 122. In one example, the video presentation may be set at 30 frames per second, with new frames being received approximately every 33 milliseconds.

Frame synthesis is particularly useful for compensating for lost or dropped packets. Data packets may be delayed, they may become corrupted, or they may be lost altogether. Since sending a re-request to a remote vehicle might only provide late data, the data loss is often ignored. However, this can result in choppy, stuttering video, which makes tele-operated driving both difficult and unpleasant for the driver over long periods of use. Alternatively, some amount of lost data can be compensated for using packet redundancy. However, the amount of packet redundancy can be limited by the cost of data transmission. The frame synthesis module described herein improves tele-operation by predicting optical flow and synthesizing a new video frame, typically with the aid of a convolutional neural network or other machine learning system.

In some embodiments, received video and optional distance map data can be decoded and processed to provide a user with a virtual live video stream supported by predicted and inserted video frames, the distance map, and included optional labeling, direction or hazard indicators. A vehicle control system 124 allows the user to transmit control instructions to the control system 108 (e.g. steer or brake a vehicle) and vehicle mounted sensor system 104 (e.g. rotate or tilt a camera) to provide real-time drivability and control of the remote vehicle over the network 110.

The network 110 can include, but is not limited to, combination or sole channels of single or bonded multiple links of satellite, cellular, microwave, Wi-Fi, dedicated RF channel, or any other wireless type of communication network, technologies and operator. In certain embodiments, commercially available 4G and 5G cellular communication systems can be used.

Figure 1B:
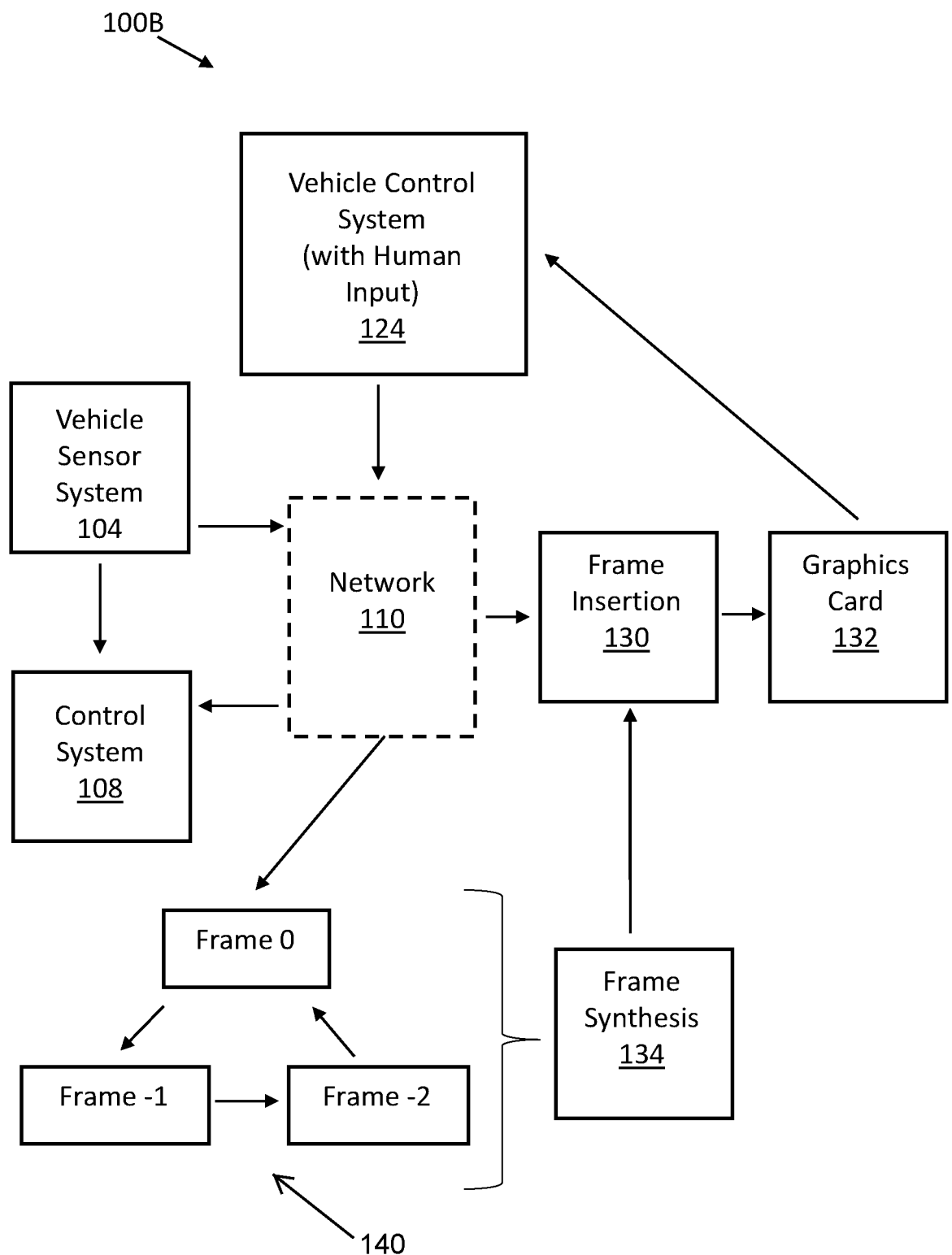

FIG. 1B illustrates a vehicle tele-operation system 100B, showing details of frame synthesis modules, such as video presentation and frame synthesis module 122, in accordance with one or more embodiments. As in FIG. 1A, a vehicle sensor system 104 and control system 108 receive and send data through a network 110. Video data with potentially missing frames is processed by a frame insertion module 130 that sends results to a graphics card 132. A video feed containing synthesized frames can be viewed by a human overseeing the vehicle control system 124. Based in part on the viewed video, control instructions are sent via network 110 to the control system 108.

Inserted frames can be used to increase effective frame rate (i.e. frame interpolation) or to substitute for missing or damaged frames (i.e. frame extrapolation). The synthesized frames may be created by a frame synthesis module 134. In some embodiments, video frames arrive and are copied into a circular buffer 140. This buffer can hold respective frames received at time steps (or time positions) t=0, t=−1, and t=−2, for example. At each time step, when a new frame arrives, it is pushed onto the buffer queue for processing. The frames in the queue are used to synthesize new frames based on earlier received frames. In some applications, if a frame is timely received, the synthesized frame that was predicted can be discarded, and frame insertion is not needed.

It should be understood that various approaches to frame synthesis can be used. For example, synthesized frames can be extrapolated from a set of previous frames by predicting an optical flow that will bring the known frames to the unknown frames. This can be done using machine intelligence techniques and models that incorporate a convolutional neural network (CNN). The general architecture of such a CNN model is an encoder-decoder network. The input can be a set of RGB images stacked in a channel dimension. The output is a set of large, pixel-wise kernels to be applied as convolutions on a subset of the input images. The size of the kernels constrains the maximum allowed optical flow. To decrease computational (and memory) cost, kernels can be predicted as a pair of N×1 and 1×N kernels, rather than one large NA2 kernel. After the large convolutions are applied to the set of reference frames, the resultant images can be averaged to produce a final synthesized frame.

The neural network may be trained end-to-end, by harvesting frames from a video sequence and then separating out from this a set of "known" and "unknown" frames. During training, there are many possible choices for a loss function. For example, L1 regularization based on summation of absolute weight values may be used. It is also possible to utilize an adversarial or perception loss, to create even sharper predictions.

For use in real-time teleoperations, the neural network must make optical flow predictions at a frequency greater than the frame rate of the video. To reduce computational cost, all convolutions in the encoder-decoder can be 3×3 or use asymmetric N×1 followed by 1×N convolutions. To further increase receptive field, dilated convolutions can also be employed. Since the most computationally expensive parts of a neural network are usually the initial layers, when full size images are being processed, real-time operation can be enabled by reducing full image processing. For example, strided convolutions can be used in the initial layers of the CNN to quickly downsample features. Alternatively, input of some of the known frames at a lower resolution is possible.

To further reduce computation time and enable real-time operation, most convolutions can be replaced by bottleneck modules. The bottleneck modules first reduce the number of channels via 1×1 convolutions. This is followed by a set of larger 3×3 or asymmetric convolutions, applied on the smaller stack of feature maps. A final set of 1×1 convolutions re-expands the number of feature channels.

The encoder side of the CNN involves a series of convolutions, followed by application of activation functions, followed by pooling. In contrast, the decoder side of the CNN may involve up-sampling processed features back to the original image size. This can be accomplished step wise, in reverse order to the encoder. To save time, the up-sampling may be done in a single step using subpixel convolution (also known as pixel shuffle). During up-sampling, it can also be helpful to mix back in preprocessed information from different scales of the encoder side of the network. This helps recover precise boundary information. One way to do this is via skip connections, directly passing information from the encoder to the decoder. If the decoder is simply a reshuffling of many small feature maps into a smaller set of large feature maps, the skip connections can be added in prior to the up-sampling by utilizing "pixel unshuffled," the natural inverse operation to pixel shuffle.

During training, it is possible to encourage sparsity in convolutional filters by applying multiplicative factors post normalization of the activations at each layer and adding these factors as additional L1 terms in the loss function. Through an iterative training process, it is then possible to prune the filters which contribute least to the output of the network. This can significantly reduce network size. Another option is using distillation, with knowledge derived from a larger CNN model or an ensemble of models being used to remove entire layers from the trained network.

Figure 2:
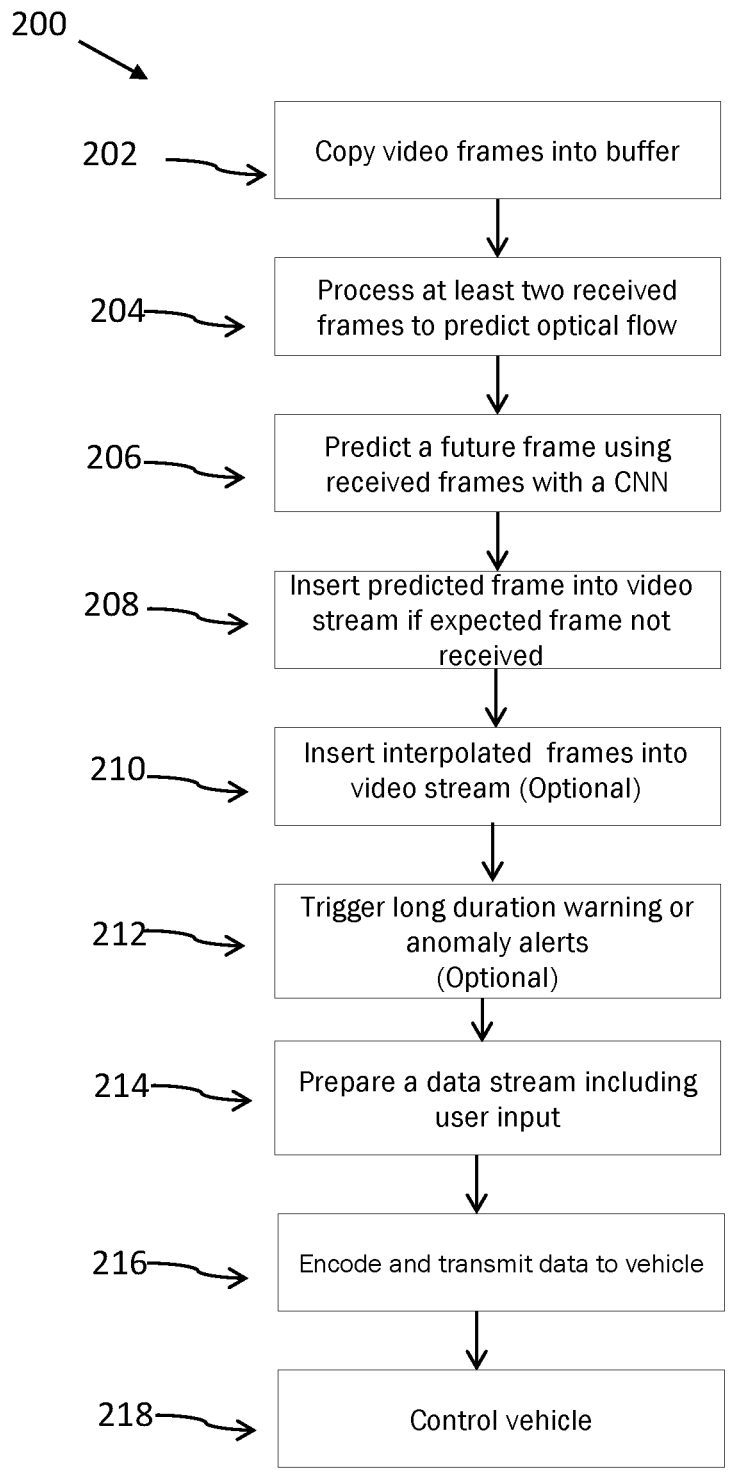
FIG. 2 illustrates an example process for frame synthesis of video data, in accordance with one or more embodiments.

FIG. 2 illustrates an example process for frame synthesis suitable for use in the described systems, such as system 100B of FIG. 1B, in accordance with one or more embodiments. In various embodiments, video frames arrive and are copied into a circular buffer, such as buffer 140 (step 202). In various embodiments, this buffer is able to hold at least two previous frames, although a buffer of three or more can be used for more accurate frame synthesis. Sequential frames in the circular buffer can be referred to as N_buffer. At each time step, when a new frame arrives, it is pushed onto the buffer queue for processing. The frames in the queue are then used to predict optical flow from the frames on the queue with respect to the next set of expected frames (step 204).

For example, an N_buffer can equal 3, and N_predict can equal 1. Elements of such a circular buffer can be referred to as frames F0, F1, and F2. Each of the frames may correspond to a particular time position of a live or near real-time video stream. For example, F0 may correspond to t=−2, F1 may correspond to t=−1, and F2 may correspond to t=0. A frame F3 corresponding to a time position subsequent to frame F2 (i.e., t=1) can be predicted from {F0, F1, F2}. To do this, a prediction for each pixel in F2 is made for how the respective pixels will move over the next single time step. The amount that each of the pixels in F1 are expected to move over the next two time steps can also be predicted. This process is continued for F0, or predictions can be limited to only the last N elements of the frame buffer. To make these predictions, as many or as few of the frames currently in the buffer can be used. In some embodiments, only a limited number of future frames (e.g. one to five frames, depending on vehicle speeds) may be predicted with high accuracy.

As another example, elements of such a circular buffer can be referred to as frames F0, F1, and F3. Frames F2 and/or F4 can be predicted from {F0, F1, F3}. To do this for F2, a prediction for each pixel in F1 is made for how the respective pixels will move over the next single time step. The amount that each of the pixels in F0 are expected to move over the next two time steps can also be predicted. Thus the system may generate a virtual frame F2. This process is may be implemented to predict F4 that is subsequent to F3, such as by generating a prediction for each pixel in F3 for how the respective pixels will move over the next single time step. The virtual frame F2 may also be used to predict F4. For example, the amount that each of the pixels in virtual frame F2 are expected to move over the next two time steps may be predicted to determine F4.

As another example, elements of such a circular buffer can be referred to as frames F0, F1, and F3. F4 can be predicted from {F0, F1, F2}. To do this, a prediction for each pixel in F2 is made for how the respective pixels will move over the next single time step. The amount that each of the pixels in F1 are expected to move over the next two time steps can also be predicted. This process is continued for F0, or predictions can be limited to only the last N elements of the frame buffer. To make these predictions, as many or as few of the frames currently in the buffer can be used. In some embodiments, only a limited number of future frames (e.g. one to five frames, depending on vehicle speeds) may be predicted with high accuracy.

Prediction for both extrapolation and interpolation can be provided by a machine learning system such as a convolutional neural network (CNN). A CNN can take in a sequence of video images held in a circular buffer as described and output a predicted optical flow for some subset of those input images (step 206). There may be more than one optical flow map generated for some of the frames in the buffer, if the number of predicted frames is to be greater than one. After the full set of optical flow maps is predicted, the set of such maps corresponding to the very next frame are immediately consumed to produce a prediction of that frame. The other flow maps may be consumed immediately as well or may be held onto until it is known whether additional predictions may be required. The extrapolated (i.e. predicted) frame may then be inserted into a video stream if the expected frame is not timely received (step 208).

Alternatively, or in addition, in an optional step 210 the predicted frames can be inserted into the video stream for frame interpolation. For example, tele-operations using a VR headset can be improved by increasing the effective frames per second (fps). In order to avoid motion sickness, a frame rate of at least 90 fps is generally recommended. Since sending that quantity of data over a cellular network can be prohibitively costly, frame interpolation can be used to increase frame rate from 30 fps to 90 fps by predicting two additional future frames for each frame that has already arrived. Alternatively, if extreme smoothness is desired for a more pleasant VR experience, such an interpolation prediction can still be choppy. In that case, computation and display of two interpolated frames can be made before receipt and display of a real frame. This can add some amount of latency (e.g. <30 ms) but will provide very smooth 90 fps video.

Alternatively, or in addition, in an optional step 212 the predicted frames may be used to trigger long duration warnings or anomaly alerts. Since the frame synthesis system is constantly monitoring the road ahead, predictions can be made of motion expected in coming frames. If future real frames deviate significantly from these predictions, then something unusual such as a collision must be happening. As another example, long distance object motion can be anticipated and used to warn the tele-operator of possible collisions with objects or elements in the car's environment. This warning information can also be provided to autonomous components of a vehicle, including braking or steering control systems.

After step 208 (and/or optional steps 210 and/or 220) and based on user input from a remote user/driver, a return data stream is prepared (step 214), which is then encoded and transmitted to the vehicle (step 216) and used to control the vehicle via control system 108 or modify operation of the sensor system 104 (step 218).

Figure 3:
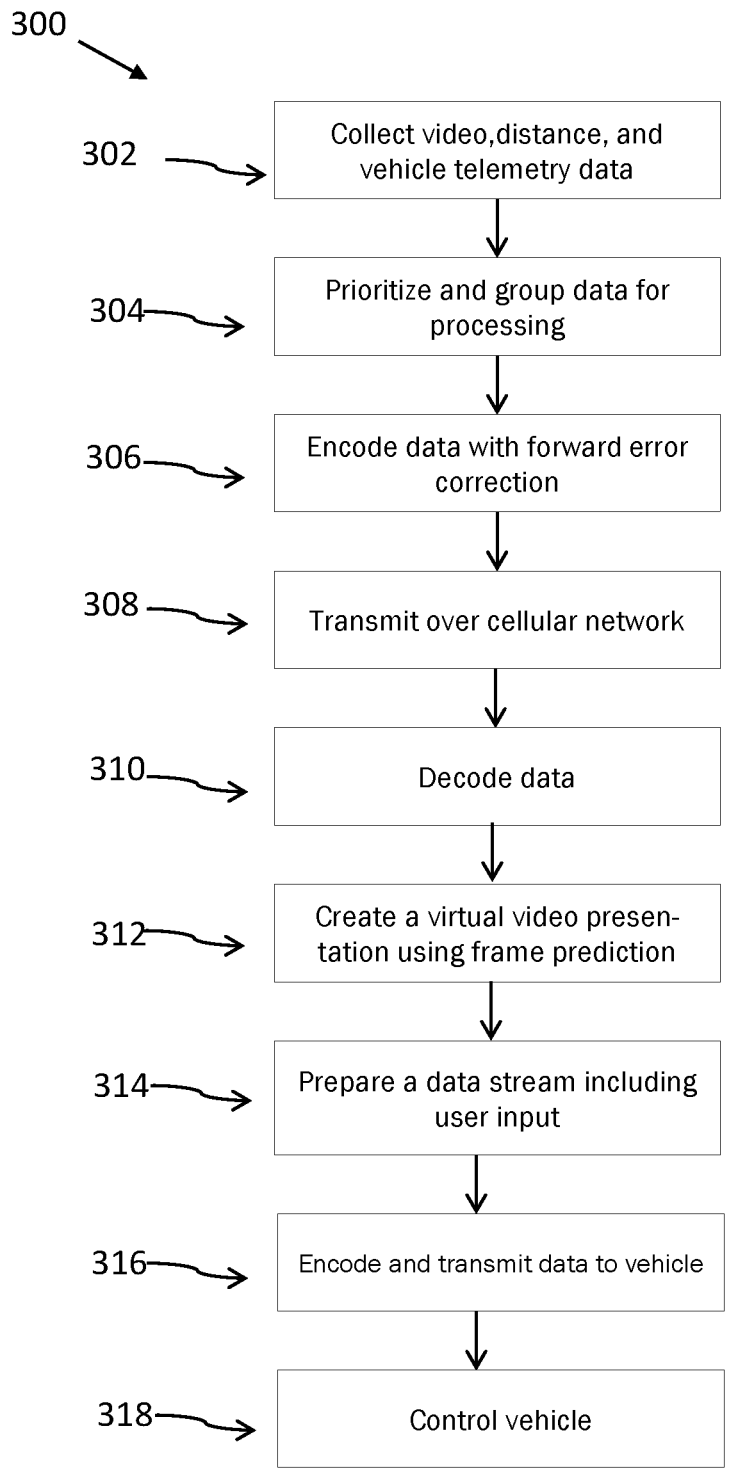
FIG. 3 illustrates an example process for operating a remote vehicle control system using video frame synthesis, in accordance with one or more embodiments.

FIG. 3 illustrates an example process 300 for operating a remote vehicle control system with video frame synthesis, in accordance with one or more embodiments. At a first step 302, video, distance map, and telemetry data are collected. Such data may be collected by one or more components of vehicle sensor system 104, such as cameras, compasses, GPS trackers, and sensors including, but not limited to, gyros (rate gyros or free gyros), accelerometers, altimeters, global positioning system (GPS), camera, or the combinations thereof. In step 304, this data is grouped and prioritized for processing prior to transmission. At step 306, some form of forward error correction is used to increase reliability of data that is then transmitted over a cellular network at step 308. At the destination, the data is decoded (step 310), and a virtual video presentation augmented by frame synthesis (including but not limited to frame extrapolation and/or frame interpolation) and including optional distance map information is created (step 312). Based on user input from a remote tele-operator/user/driver, a return data stream is prepared (step 314), which is then encoded and transmitted to the vehicle (step 316) and used to control the vehicle or modify operation of the sensor system (step 318).

Frame extrapolation and/or frame interpolation can be used in conjunction with various other techniques and hardware systems to improve vehicle tele-operation. For example, there can be difficulties associated with transmission of real-time streaming video data with the necessary low latency and quality for tele-operation over existing cellular wireless infrastructures. Typically, cellular networks sending data packets via an Internet protocol such as Transmission Control Protocol (TCP) or User Datagram Protocol (UDP). These data packets are forwarded to intermediary routers until arriving at a destination. TCP guarantees that a destination will receive the packets by having the data originator provide number ordering to the data packets. The destination sends messages back to confirm packet receipt. If the originator does not get a correct response, the packets are resent to ensure receipt. Packets are also checked for errors to ensure that data is not lost or corrupted in transit.

Unfortunately, while reliable, TCP protocol is too slow to provide real-time streaming video suitable for vehicle control, since packet routing delays and packet retransmit requests can prevent video transmission for multiple seconds. To increase data transmission speed, conventional UDP protocols can be used. UDP protocols are similar to TCP protocols, but eliminate confirmation of data receipt and provide no deliverability guarantees. When using UDP protocols, packets are just sent to the destination. The originator does not wait to make sure the destination received the packet, and simply continues to send the additional data packets. There is no guarantee that the destination receives all the packets and there is no way to request resend of a data packet. While this level of data quality can be sufficient for general streaming video with buffering, the potential for intermittent loss of video data necessary for real-time remote driving applications requires an improved system that can be used in addition to the video frame synthesis systems and methods described herein.

As will be appreciated, while commercially available 4G and 5G cellular communication systems can support the system and described methods, any combination of single or bonded multiple links of satellite, cellular, microwave, Wi-Fi, dedicated RF channel, or any other wireless type of communication network, technologies and operators can be used. In some systems, such as those based on Coded Orthogonal Frequency Division Multiplexing (COFDM), forward error correction is applied to the signal before transmission to overcome errors in the transmission due to lost carriers from frequency selective fading, channel noise and other propagation effects.

In some embodiments, useful in connection with the described frame synthesis system, a video camera system can include a plurality of video cameras to provide a multiple video feed of the vehicle environment and interior of the vehicle. Cameras can be mounted on the interior, front, back and sides of a vehicle. In some embodiments, cameras can be grouped into clusters, with multiple cameras pointed to provide separated and slightly overlapping fields of view. Stereo cameras can be used to provide distance measurements, and infrared, UV, or hyperspectral cameras systems can be used. Cameras can provide video frame data at a rate ranging from 10 frames per second to as much as 60 frames per second. In one embodiment, the display is configured to display a real time video and audio feed to a remote user, providing the experience of a virtual passenger to the driver in the vehicle. A three hundred sixty-degree (360°) camera can be situated on or inside in the vehicle in some embodiments. Alternatively, or in addition, a 360° image can be compiled from images taken by the multiple cameras and used to form a 360° image displayed on the remote display.

A distance mapping sensor system can include a lidar system, a radar system, a stereo imaging system for distance determination, a monocular system for distance determination, and an ultrasonic sensing system. The lidar system can include multiple scanning lasers and suitable time-of-flight measurement systems to provide distance from a vehicle to another vehicle, moving object, or fixed object with sub-meter resolution. In some embodiments, imaging cameras that additionally provide time-of-flight distance data can be used.

In addition to video and distance viewing, other data can also be sent to track and monitor various vehicle attributes and the environment of the vehicle or through which it travels. For example, vehicle related data such as speedometer data, geo-positioning system (GNSS/GPS) data, accelerometer data, yaw, pitch and roll data, load weight, oil or hydraulic fluid levels, fluid temperature, exhaust data, vehicle door status, wiper blade status, and dashboard data. Internal or external environmental data including audio data, chemical sensor data (e.g. carbon monoxide levels), internal and external temperature data.

In some embodiments, the data handling system can include a video prioritization module to order video data or other data at least in part by priority. Prioritization can include use of video frame interleaving prior to transmission. In some embodiments, duplication of key views or ordering multiple video streams in order of importance (e.g. forward video views are sent first) can occur. Priorities can also be determined at a packet level, depending on their attributes such as video or telemetry data, or video packet type (such as B-frame or I-frame, or audio-frame).

In another embodiment, the data handling system compresses the video data using a forward error correction module. Forward error correction of transmitted data provided by the forward error correction module can include use of a maximum separable distance erasure code. Such an erasure code generates n encoding symbols from a set of k source symbols ($k<n$). Erasure codes can be split into two categories maximum separable distance (MDS) codes and non-MDS codes. MDS codes provide that the k source symbols can be recovered from any set of k encoding symbols among the n ones.

Non-MDS codes such as Fountain codes, Raptor codes, or Low Density Parity Check (LDPC) codes can be used in some embodiments. In a typical non-MDS code, $(1+e)*k$ symbols are needed on average to recover the k source symbols, where $e>0$. Other conventional non-MDS codes such as Tornado codes, IRA, or Luby Transform (LT) codes that encode with a constant number of XOR blocks can be used, as well as HoVer and WEAVER codes. Typically, these codes generate a random number between a range of numbers equal to the number of data blocks that a video frame can be partitioned into. A corresponding number of data blocks are chosen at random and combined with an XOR operation. The transmitted combination is then received and decoded using redundant information that allow data blocks reconstruction even is some data blocks are lost.

Alternatively, in other embodiments MDS codes can be constructed from Vandermonde matrices (providing, for example, Reed-Solomon codes), a Fermat Number Transform (providing, for example, FNT based Reed-Solomon codes), or from Cauchy matrices (providing, for example, Cauchy Reed-Solomon codes).

In one embodiment, the data handling system compresses the video, distance, and telemetry data using a Cauchy Reed-Solomon code. As compared to a Reed-Solomon code, a Cauchy Reed-Solomon code provides an algorithm that converts all encoding operations to XORs, so that encoding takes $O(n \log 2(m+n))$ XORs per coding block. In addition, a Cauchy distribution matrix is used rather than the standard Vandermonde distribution matrix, to improve performance of matrix inversion for decoding. More specifically, a Cauchy Reed-Solomon code uses n data words, which are represented in a column vector D=<D1, ..., Dn>. D is multiplied by an (n+m)×n distribution matrix, with first n rows being the identity matrix. The product is an n+m-element column vector D|C, with C=<C1, ..., Cm> representing the coding words. Since the distribution matrix must have the property that all n×n submatrices are invertible, an m×n Cauchy matrix can be used, again over GF (2w), where n+m≤2w. An m×n Cauchy matrix is defined as follows. Let X={x1, ..., xm} and Y={y1, ..., yn} be defined such that each xi and yi is a distinct element of GF (2w), and X∩Y=□. Then the Cauchy matrix is defined by X and Y and has 1/(xi+yj) in element i, j. The distribution matrix can be composed of the identity matrix in the first n rows, and a Cauchy matrix in the remaining m rows with the property that all n×n submatrices are invertible. These submatrices can also be inverted in O(n2) Galois operations. In another aspect that improves performance, operations over GF (2w) can be converted into XORs by having each element e of GF (2w) represented by a 1×w column vector of bits, V (e). This vector is equivalent to the standard binary representation of the element. Each element e of GF (2w) may also be represented by a w×w matrix of bits, M (e), where the i-th column of M (e) is equal to the column vector V (e2i−1). Coding packets are determined using only XOR operations. Decoding proceeds by deleting the rows of the distribution matrix that correspond to packet or other data loss failures, inverting the resulting matrix, and multiplying it by the surviving words in order to recalculate the lost data.

Advantageously, both MDS and non-MDS codes are useful for applications where, due to real time limitations, packet losses cannot be recovered by retransmission. This can include video data transmitted over cellular networks (e.g. using a Real Time Transport Protocol (RTP) carried on User Datagram Protocol (UDP) packets), multicast transmissions of multiple video feeds, or data chunks of wireless peer to peer networks (e.g. Vehicle-to-Vehicle or Vehicle-to-X networks). In one embodiment, the data handling system transmits packets by a User Datagram Protocol (UDP) with priority ordered and compressed using a Cauchy Reed-Solomon code.

The virtual control system can include a voxel render module to create a distance map. To improve decode speed and render performance, in some embodiments the three-dimensional distance maps created by lidar or other distance sensors that are supported by vehicle mounted sensor and communication system can be compressed using a space filling curve algorithm. Such a space filling curve mapping allows mapping from a higher three-dimensional space to a lower one-dimensional space where points which are close in the higher-dimensional space map to points which are close in the one dimensional space. Advantageously, this simplifies compression and reconstruction of the distance maps. Hilbert and Hilbert-like (i.e. poly-Hilbert curves such as Neptunus and Luna curves) space filling curves can be used. In other embodiments, sweep, scan, Peano, or Gray curves can be used.

The virtual control system can provide that the virtual reality view and control system display decoded and reconstructed vehicle video feeds, including those that include frame extrapolation or frame interpolation. It will be appreciated that various types of displays can be used to visualize the video and distance map data, including as a desktop computer screen, mobile electronic devices, projectors or a 3D hologram. In one embodiment, a virtual reality display, such as a head mounted device (HMD) such as an Oculus Rift virtual reality system or other headsets, Google Glass or other optical head-mounted display can be used. In some embodiments, the vehicle sensor system and included cameras are configured so that movement of a remote HMD display by the remote user is sent via vehicle control system and cellular network to move cameras of the vehicle sensor system. In other embodiments, movement of HMD does not cause actual movement of the onboard camera(s), but instead results in reprioritization of video feeds (e.g. looking backward will increase priority of rear camera video feeds from the vehicle).

Various techniques for mapping multiple video feeds onto a virtual image sphere (or partial sphere) are available. For example, a cubic projection viewing system can be used, as well as viewers based on equiangular or equirectangular cubemaps, or pyramid encoding.

In some configurations, the system is capable of combining virtual and augmented reality methods with real-time video and/or audio and with real-time vehicle telemetry data. This permits, for example, providing three dimensional (3D) augmented reality with dynamics virtual pointers, text, or other indicators to allow a remote user to better interact with the vehicle, while still providing real-time information.

Figure 4:
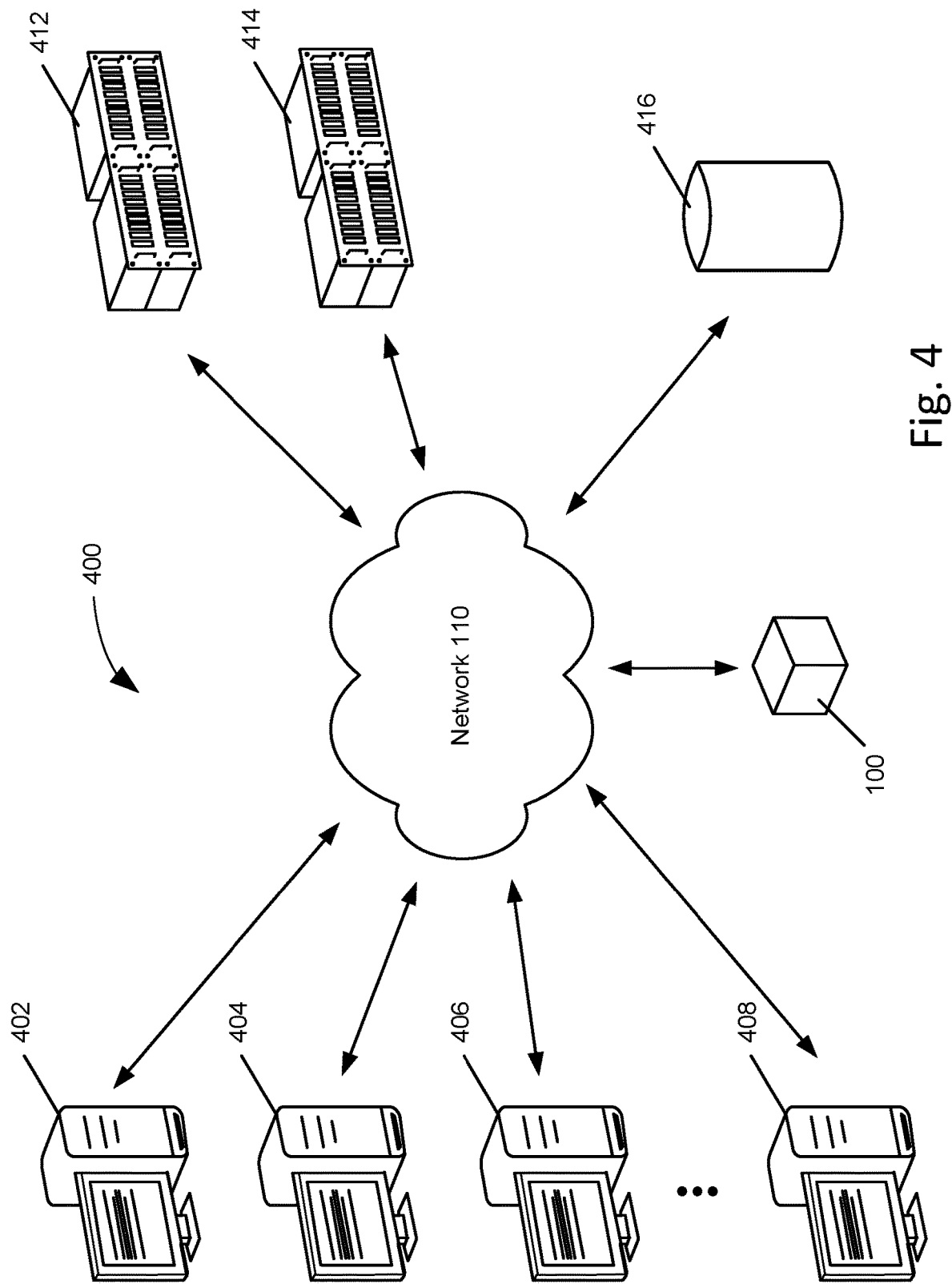
FIG. 4 illustrates a diagram of an example network architecture for implementing various systems and methods of the present disclosure, in accordance with one or more embodiments.

In various embodiments, a vehicle tele-operation system may be communicatively coupled to various client devices over a wireless network system. FIG. 4 illustrates a diagram of an example network architecture for implementing various systems and methods of the present disclosure, in accordance with one or more embodiments. In various embodiments, network architecture 400 includes a number of client devices 402-408 communicably connected to vehicle tele-operation system 100 and one or more server systems 412 and 414 by a network 110. In some embodiments, vehicle tele-operation system 100 may be systems 100A or 100B, previously described. In some implementations, the network 110 may be a public communication network (e.g., the Internet, cellular data network, dial up modems over a telephone network) or a private communications network (e.g., private LAN, leased lines).

In some embodiments, server systems 412 and 414 include one or more processors and memory. The processors of server systems 412 and 414 execute computer instructions (e.g., network computer program code) stored in the memory to perform functions of a network data exchange server. In various embodiments, the functions of the network data exchange server may include live broadcast (transmission and receipt) of video data.

In some embodiments, server system 412 is a content server configured to receive and store video data and/or vehicle control programming. In some embodiments server system 414 is a dispatch server configured to transmit and/or route network data packets including network messages. In some embodiments, content server 410 and dispatch server 412 are configured as a single server system that is configured to perform the operations of both servers.

In some embodiments, the network architecture 400 may further include a database 416 communicably connected to client devices 402-408 and server systems 412 and 414 via network 110. In some embodiments, network data, or other information such as user/driver/operator information, vehicle information, and control programming, may be stored in and/or retrieved from database 416.

In various embodiments, one or more of client devices 402-408 may be configured as a controller system, such as virtual control system 120, to control the movement and operation of a vehicle tele-operation system 100, including vehicle sensor system 104 and/or control system 108. For example, the client devices 402-408 may execute software applications that are specific to vehicle tele-operation system 100. In some embodiments, a controller interface may be displayed on a user interface of the client device, such as within an application. The controller interface may be used to maneuver the vehicle, as well as operate various sensors. The controller interface may also receive data collected from the sensor system 104.

In various implementations, the client devices 402-408 can be computing devices such as laptop or desktop computers, smartphones, personal digital assistants, portable media players, tablet computers, or other appropriate computing devices that can be used to communicate over network 110. In some implementations, the server system 412 can include one or more computing devices such as a computer server. In some implementations, content server 410 and/or dispatch server 412 are configured with one or more of client devices 402-408 as a single control system, such as virtual control system 120, for control and operation of vehicle tele-operation system 100. In some implementations, the server system 412 can represent more than one computing device working together to perform the actions of a server computer (e.g., cloud computing).

With reference to FIG. 5, shown is a particular example of a computer system that can be used to implement particular examples of the present disclosure. For instance, the computer system 500 may represent a vehicle mounted sensor and communication system, virtual control system, client device, or server, according to various embodiments described above. According to particular example embodiments, a system 500 suitable for implementing particular embodiments of the present disclosure includes a processor 501, a memory 503, an accelerator 505, an interface 511, and a bus 515 (e.g., a PCI bus or other interconnection fabric). When acting under the control of appropriate software or firmware, the processor 501 is responsible for controlling operational functions of a vehicle and/or associated sensors, and transmitting data over a network between client devices, servers, virtual control systems, and/or sensor and communication systems. Various specially configured devices can also be used in place of a processor 501 or in addition to processor 501. The complete implementation can also be done in custom hardware.

The interface 511 may include separate input and output interfaces, or may be a unified interface supporting both operations. When acting under the control of appropriate software or firmware, the processor 501 is responsible for such tasks such as video frame synthesis. Various specially configured devices can also be used in place of a processor 501 or in addition to processor 501. The complete implementation can also be done in custom hardware. The interface 511 is typically configured to send and receive data packets or data segments over a network. Particular examples of interfaces the device supports include Ethernet interfaces, frame relay interfaces, cable interfaces, DSL interfaces, token ring interfaces, and the like. Generally, these interfaces may include ports appropriate for communication with the appropriate media. In some cases, they may also include an independent processor and, in some instances, volatile RAM. The independent processors may control such communications intensive tasks as packet switching, media control and management.

In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to particular example embodiments, the system 500 uses memory 503 to store data and program instructions and maintained a local side cache. The program instructions may control the operation of an operating system and/or one or more applications, for example. The memory or memories may also be configured to store received metadata and batch requested metadata.

In some embodiments, system 500 further comprises a graphics processing unit (GPU) 509. As described above, the GPU 509 may be implemented to process each pixel on a separate thread to compute and determine transformations. In some embodiments, system 500 further comprises an accelerator 505. In various embodiments, accelerator 505 is a rendering accelerator chip, which may be separate from the graphics processing unit. Accelerator 505 may be configured to speed up the processing for the overall system 500 by processing pixels in parallel to prevent overloading of the system 500. For example, in certain instances, ultra-high-definition images may be processed, which include many pixels, such as DCI 4K or UHD-1 resolution. In such instances, excess pixels may be more than can be processed on a standard GPU processor, such as GPU 509. In some embodiments, accelerator 505 may only be utilized when high system loads are anticipated or detected.

In some embodiments, accelerator 505 may be a hardware accelerator in a separate unit from the CPU, such as processor 501. Accelerator 505 may enable automatic parallelization capabilities in order to utilize multiple processors simultaneously in a shared memory multiprocessor machine. The core of accelerator 505 architecture may be a hybrid design employing fixed-function units where the operations are very well defined and programmable units where flexibility is needed. In various embodiments, accelerator 505 may be configured to accommodate higher performance and extensions in APIs, particularly OpenGL 2 and DX9.

CONCLUSION

In the foregoing description, reference is made to the accompanying drawings that form a part thereof, and in which is shown by way of illustration specific exemplary embodiments in which the disclosure may be practiced. These embodiments are described in sufficient detail to enable those skilled in the art to practice the concepts disclosed herein, and it is to be understood that modifications to the various disclosed embodiments may be made, and other embodiments may be utilized, without departing from the scope of the present disclosure. The foregoing detailed description is, therefore, not to be taken in a limiting sense.

Reference throughout this specification to "one embodiment," "an embodiment," "one example," or "an example" means that a particular feature, structure, or characteristic described in connection with the embodiment or example is included in at least one embodiment of the present disclosure. Thus, appearances of the phrases "in one embodiment," "in an embodiment," "one example," or "an example" in various places throughout this specification are not necessarily all referring to the same embodiment or example. Furthermore, the particular features, structures, databases, or characteristics may be combined in any suitable combinations and/or sub-combinations in one or more embodiments or examples. In addition, it should be appreciated that the figures provided herewith are for explanation purposes to persons ordinarily skilled in the art and that the drawings are not necessarily drawn to scale.

Embodiments in accordance with the present disclosure may be embodied as an apparatus, method, or computer program product. Accordingly, the present disclosure may take the form of an entirely hardware-comprised embodiment, an entirely software-comprised embodiment (including firmware, resident software, micro-code, etc.), or an embodiment combining software and hardware aspects that may all generally be referred to herein as a "circuit," "module," or "system." Furthermore, embodiments of the present disclosure may take the form of a computer program product embodied in any tangible medium of expression having computer-usable program code embodied in the medium.

Any combination of one or more computer-usable or computer-readable media may be utilized. For example, a computer-readable medium may include one or more of a portable computer diskette, a hard disk, a random access memory (RAM) device, a read-only memory (ROM) device, an erasable programmable read-only memory (EPROM or Flash memory) device, a portable compact disc read-only memory (CDROM), an optical storage device, and a magnetic storage device. Computer program code for carrying out operations of the present disclosure may be written in any combination of one or more programming languages. Such code may be compiled from source code to computer-readable assembly language or machine code suitable for the device or computer on which the code will be executed.

Embodiments may also be implemented in cloud computing environments. In this description and the following claims, "cloud computing" may be defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction and then scaled accordingly. A cloud model can be composed of various characteristics (e.g., on-demand self-service, broad network access, resource pooling, rapid elasticity, and measured service), service models (e.g., Software as a Service ("SaaS"), Platform as a Service ("PaaS"), and Infrastructure as a Service ("IaaS")), and deployment models (e.g., private cloud, community cloud, public cloud, and hybrid cloud).

The flow diagrams and block diagrams in the attached figures illustrate the architecture, functionality, and operation of possible implementations of systems, methods, and computer program products according to various embodiments of the present disclosure. In this regard, each block in the flow diagrams or block diagrams may represent a module, segment, or portion of code, which comprises one or more executable instructions for implementing the specified logical function(s). It will also be noted that each block of the block diagrams and/or flow diagrams, and combinations of blocks in the block diagrams and/or flow diagrams, may be implemented by special purpose hardware-based systems that perform the specified functions or acts, or combinations of special purpose hardware and computer instructions. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flow diagram and/or block diagram block or blocks. Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims. It is also understood that other embodiments of this invention may be practiced in the absence of an element/step not specifically disclosed herein.

The invention claimed is:

1. A remote vehicle control system comprising:
a virtual control system configured to:
process video data received from a vehicle mounted sensor system of a vehicle, the vehicle mounted sensor system including a video camera system, wherein the video data includes a plurality of sequential image frames of a video stream, each image frame corresponding to a time position of the video stream, the video stream representing a forward vehicle view, frames of a second vehicle view being prioritized lower than frames of the forward vehicle view;
store the plurality of image frames within a circular buffer;
generate an optical flow map based on at least two consecutive image frames in the circular buffer, the optical flow map predicting pixel positions of a virtual image frame corresponding to a desired time position of the video data;
synthesize the virtual image frame for insertion into the desired time position of the video stream, wherein synthesizing the virtual image frame is supported by a convolutional neural network, the neural network making optical frame predictions at a frequency greater than the frame rate of the video;
create a modified video stream by inserting the virtual image frame into the desired time position of the video stream, the modified video stream representing surroundings of the vehicle;
determining that a collision is occurring based, at least in part, on the predicted pixel positions of the virtual image frame;
generating a warning that the collision is occurring;
provide the modified video stream via a display using distance map data received from the vehicle mounted sensor system;
after the modified video stream has been provided via the display, process input received via an input device, the input indicating control instructions, the control instructions controlling operation of the vehicle; and
transmit the control instructions via a network to the vehicle;
wherein kernels are predicted as a pair of N×1 and 1×N kernels;
wherein convolutions of an encoder-decoder include dilated convolutions.

2. The remote vehicle control system of claim 1, wherein the network is a cell phone network.

3. The remote vehicle control system of claim 1, wherein synthesizing the virtual image frame is supported by a convolutional neural network.

4. The remote vehicle control system of claim 1, wherein synthesizing the virtual image frame is used to interpolate frames to increase effective frames per second.

5. The remote vehicle control system of claim 1, wherein synthesizing the virtual image frame is used to extrapolate frames to replace missing or damaged video frames.

6. The remote vehicle control system of claim 1, wherein the video data is received over a cellular network using feed forward correction.

7. The remote vehicle control system of claim 1, wherein the virtual control system further comprises a virtual reality headset.

8. The remote vehicle control system of claim 1, the video data including frames ordered at least in part by priority.

9. The remote vehicle control system of claim 1, the video data including interleaved video frames.

10. The remote vehicle control system of claim 1, wherein the video data has been compressed using a maximum separable distance erasure code.

11. The remote vehicle control system of claim 1, wherein the video data has been compressed using Cauchy Reed-Solomon code.

12. The remote vehicle control system of claim 1, wherein the video data includes packets transmitted by a User Datagram Protocol (UDP).

13. A method comprising:
receiving, at a control system, video data from a vehicle mounted sensor system of a vehicle, the vehicle mounted sensor system including a video camera system, wherein the video data includes a plurality of sequential image frames of a video stream, each image frame corresponding to a time position of the video stream, the video stream representing a forward vehicle view, frames of a second vehicle view being prioritized lower than frames of the forward vehicle view;
storing, by the control system, the plurality of image frames within a circular buffer;
generating, at the control system, an optical flow map based on at least two consecutive image frames in the circular buffer, the optical flow map predicting pixel positions of a virtual image frame corresponding to a desired time position of the video data;
synthesizing, at the control system, the virtual image frame for insertion into the desired time position of the video stream, wherein synthesizing the virtual image frame is supported by a convolutional neural network, the neural network making optical frame predictions at a frequency greater than the frame rate of the video;
creating, at the control system, a modified video stream by inserting the virtual image frame into the desired time position of the video stream, the modified video stream representing surroundings of the vehicle;
determining that a collision is occurring based, at least in part, on the predicted pixel positions of the virtual image frame;
generating a warning that the collision is occurring;
providing, at the control system, the modified video stream via a display using distance map data received from the vehicle mounted sensor system;
after the modified video stream has been provided via the display, processing, at the control system, input received via an input device, the input indicating control instructions, the control instructions controlling operation of the vehicle; and
transmitting, by the control system, the control instructions via a network to the vehicle;
wherein kernels are predicted as a pair of N×1 and 1×N kernels;
wherein convolutions of an encoder-decoder include dilated convolutions.

14. The method of claim 13, wherein the virtual image frame is an extrapolated image frame and the desired time position is subsequent to the time positions corresponding to the at least two consecutive image frames.

15. The method of claim 14, further comprising:
determining that an expected image frame corresponding to the desired time position is unavailable; and
inserting the extrapolated image into the video stream subsequent to the at least two consecutive image frames.

16. The method of claim 13, wherein the virtual image frame is an interpolated image frame and the desired time position is between the time positions corresponding to the at least two consecutive image frames.

17. The method of claim 16, wherein insertion of the interpolated image increases the frame rate of the video stream.

18. The method of claim 13, wherein the optical flow map is generated by a convolutional neural network.

19. One or more non-transitory computer readable media having instructions stored thereon for performing a method, the method comprising:
processing, at a control system, video data received from a vehicle mounted sensor system of a vehicle, the vehicle mounted sensor system including a video camera system, wherein the video data includes a plurality of sequential image frames of a video stream, each image frame corresponding to a time position of the video stream, the video stream representing a forward vehicle view, frames of a second vehicle view being prioritized lower than frames of the forward vehicle view;
storing, by the control system, the plurality of image frames within a circular buffer;
generating, at the control system, an optical flow map based on at least two consecutive image frames in the circular buffer, the optical flow map predicting pixel positions of a virtual image frame corresponding to a desired time position of the video data;
synthesizing, at the control system, the virtual image frame for insertion into the desired time position of the video stream, wherein synthesizing the virtual image frame is supported by a convolutional neural network, the neural network making optical frame predictions at a frequency greater than the frame rate of the video;
creating, at the control system, a modified video stream by inserting the virtual image frame into the desired time position of the video stream, the modified video stream representing surroundings of the vehicle;
determining that a collision is occurring based, at least in part, on the predicted pixel positions of the virtual image frame;
generating a warning that the collision is occurring;
providing, at the control system, the modified video stream via a display using distance map data received from the vehicle mounted sensor system;
after the modified video stream has been provided via the display, processing, at the control system, input received via an input device, the input indicating control instructions, the control instructions controlling operation of the vehicle; and
transmitting, by the control system, the control instructions via a network to the vehicle;
wherein kernels are predicted as a pair of N×1 and 1×N kernels;
wherein convolutions of an encoder-decoder include dilated convolutions.

20. The remote vehicle control system of claim 1, wherein a loss function includes L1 regularization based on summation of absolute weight values.

21. The remote vehicle control system of claim 1, wherein strided convolutions are used in initial layers of a neural network.

22. The remote vehicle control system of claim 1, wherein a plurality of convolutions are replaced by bottleneck modules, the bottleneck modules reducing a number of channels via 1×1 convolutions.

23. The remote vehicle control system of claim 1, wherein an encoder side of a convolutional neural network includes a series of convolutions, followed by application of activation functions, followed by pooling.

* * * * *